United States Patent [19]

Bemm

[11] 4,338,075

[45] Jul. 6, 1982

[54] COMBINATION CAMPSTOVE AND LANTERN

[76] Inventor: Robert A. Bemm, 1241 Swainwood Dr., Glenview, Ill. 60025

[21] Appl. No.: 106,870

[22] Filed: Dec. 26, 1979

[51] Int. Cl.³ .............................................. F23D 13/04
[52] U.S. Cl. ..................................... 431/344; 126/252
[58] Field of Search ................... 126/59, 47, 48, 39 R, 126/40, 209, 267, 252, 253, 258, 260, 231; 431/344, 110, 354, 203; 48/180 C, 180 F

[56] References Cited

U.S. PATENT DOCUMENTS

| 739,934 | 9/1903 | Sieverts et al. | 431/110 |
| 934,120 | 9/1909 | Williams | 126/252 |
| 3,361,298 | 1/1968 | Trumble | 431/344 |
| 3,648,680 | 3/1972 | Hein | 431/344 X |
| 4,105,013 | 8/1978 | Vache | 431/344 |

FOREIGN PATENT DOCUMENTS 184276  8/1922  United Kingdom ................ 431/344

*Primary Examiner*—Samuel Scott
*Assistant Examiner*—Randall L. Green
*Attorney, Agent, or Firm*—Leydig, Voit, Osann, Mayer & Holt, Ltd.

[57] ABSTRACT

A collapsible campstove and lantern arrangement which may be readily converted from a campstove to a camp lantern and which is disassembleable into a compact lightweight unit that can be easily carried by a backpacking camper. The campstove and lantern arrangement includes a lantern subassembly that is adapted to support a standard cloth mantle and efficiently distribute the fuel during burning so as to produce a relatively bright lighting effect. The illustrated lantern subassembly includes an apertured flame distributor having a smooth uninterrupted sleeve portion intermediate its ends about which the cloth mantle may be tied in its assembled position. The lower end of the distributor tube is formed with a plurality of resilient fingers that permit the lantern subassembly to be removeably and adjustably positioned on different sized gas outlet tubes of camp stoves.

11 Claims, 4 Drawing Figures

U.S. Patent  Jul. 6, 1982  4,338,075
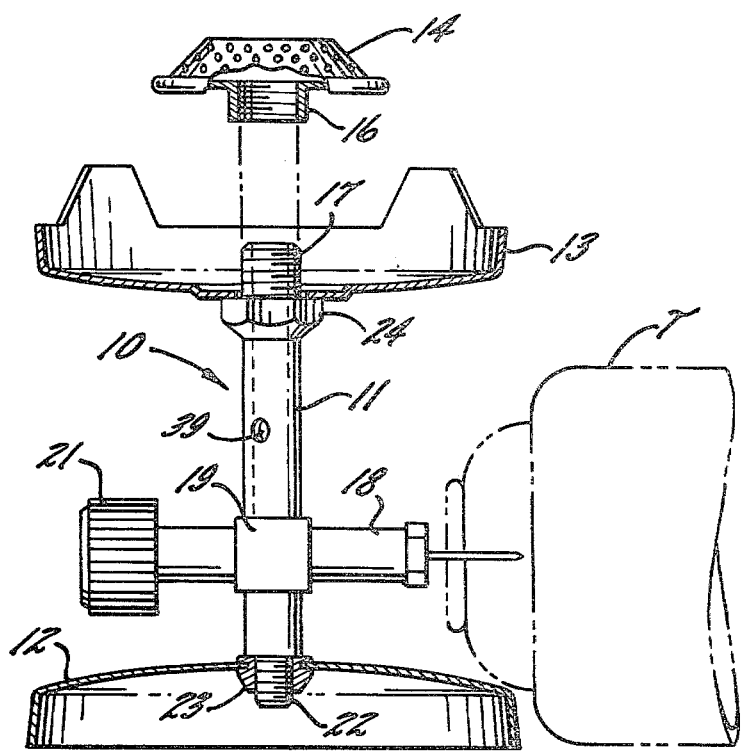
fig. 1.
fig. 2.
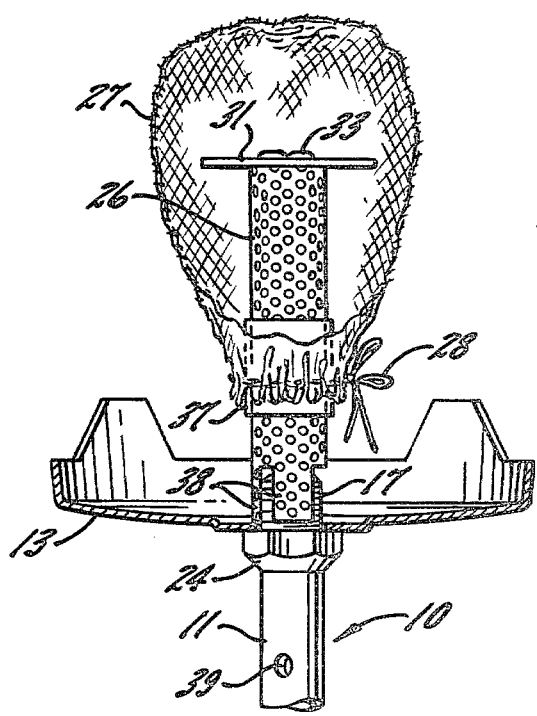
fig. 3.
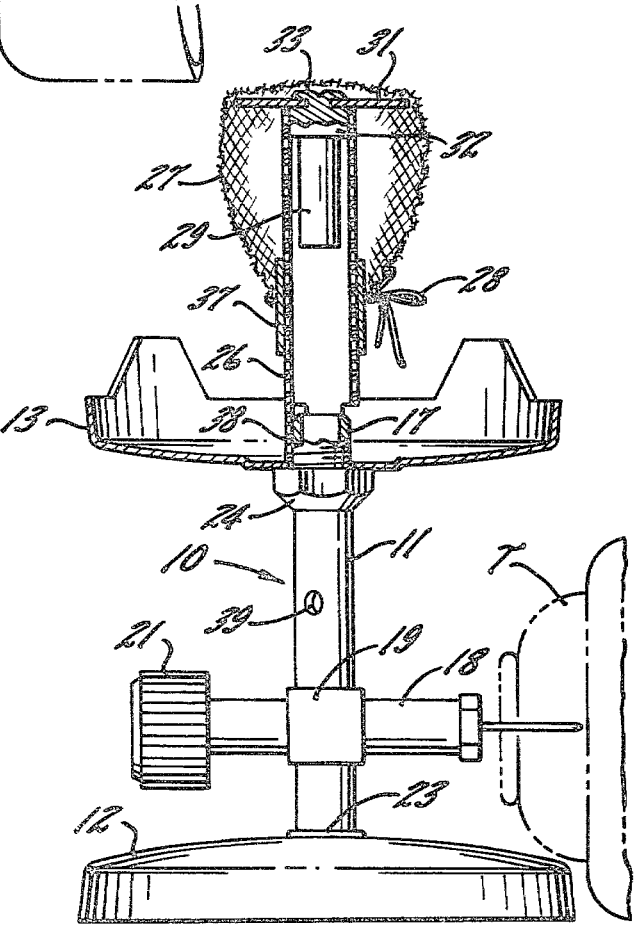
fig. 4.

COMBINATION CAMPSTOVE AND LANTERN

DESCRIPTION OF THE INVENTION

This invention is in the field of combination campstove and lantern arrangements and more particularly concerns such arrangements in which the campstove burner head is replaceable with a lantern subassembly.

When backpack camping, it is often desirable to have a source of light that is greater than that generated from relatively small flashlights commonly carried by backpackers. Because of the weight and bulk of larger flashlights, or the commonly used fuel powered camper's lantern that utilizes cloth mantles to generate relatively bright lighting effects, such devices usually are not available to the backpacker.

While attempts have been made to provide both a combined camping lantern and stove arrangement, such prior proposals have been relatively heavy and cumbersome, or have been limited in use to a specific type of camp lantern or stove, or have not permitted utilization of the standard cloth lantern mantle.

It is an object of the present invention to provide a collapsible combination campstove and lantern arrangement which is relatively small and light in weight, and lends itself to easy storage and transport by backpacking campers.

Another object is to provide a combination campstove and lantern as characterized above which utilizes standard cloth lantern mantles and is adapted to produce a relatively bright lighting effect.

A further object is to provide a lantern attachment subassembly that is readily adaptable and useable with various existing campstoves.

Other objects and advantages of the invention will become apparent upon reading the following detailed description and upon reference to the drawings in which:

FIG. 1 is a side view, partially in section, of a campstove burner base wherein the burner head is shown disassembled therefrom;

FIG. 2 is a perspective view of a lantern subassembly for the burner base of FIG. 1;

FIG. 3 is a side view, partially in section, of the lantern subassembly of FIG. 2 mounted on a gas campstove burner base with an unburnt cloth mantle over the upper portion of the subassembly and tied thereto; and FIG. 4 is a side view similar to that of FIG. 1 with the lantern subassembly mounted on the burner base and a burnt lantern mantle mounted thereon.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

With reference to FIG. 1, there is shown a lightweight collapsible campstove typically carried by backpackers. The stove includes a burner base 10 having a gas tube 11 mounted on a stand 12 and supporting a platform 13 upon which cooking apparatus or the like is positioned during use of the stove. A burner head, or stove attachment, 14 having an internally threaded neck 16 is shown unscrewed from the threaded upper end 17 of the burner tube 11. Gas is supplied from a tank T through a tube 18, a valve 19 and the gas tube 11 to provide fuel for the burner head 14 when lit. A control knob 21 controls the setting of the valve 19 to determine the rate of flow of gas through the tube 11.

To maintain the gas tube 11 in an upright position a threaded stud 22 on the bottom of the gas tube is threadedly received by a nut 23 mounted in the stand 12. A radially extending flanged collar 24 at the top of the gas tube 11 supports the platform 13.

In accordance with the invention, the burner head 14 is unscrewed from the gas tube 11 as shown in FIG. 1, and is replaceable with a lantern assembly 25 which is adapted to operatively support a standard cloth mantle. The lantern assembly 25 includes a foraminous tube 26 which replaces the burner head 14 on the threaded end 17 of the gas tube 11. To produce light, a standard cloth lantern mantle 27 is placed over the tube 26 and secured about its perimeter by a drawstring 28. After the mantle 27 has been prepared by burning, the gas fuel from the tank T is lit as it emerges from the top of the flame distributor tube 26, illuminating the lantern mantle.

To support the mantle 27 in its vertically disposed position and to distribute gas along the length of the flame distributor 26, a substantially T-shaped (in cross section) adaptor is provided. The adapter includes a cylindrical rod portion 29 that extends coaxially within the tubular flame distributor 26 and has a transverse flange or deflector plate 31 extending radially outwardly at one end thereof which rests upon the flame distributor. In order to securely maintain the rod portion 29 of the adapter in place within the tubular flame distributor 26, the rod portion is formed with an annular shoulder 32 that forms a friction fit within the flame distributor 26. The adapter in this instance is formed of two parts: namely, the elongated rod 29 and the transverse deflector plate 31. To securely fasten the two members together, the rod 29 is formed with an outwardly extending tip 33 which extends through an aperture in the plate 31 and is flattened in riveted fashion to secure the two members together.

The spacing between the outside diameter of the rod 29 and the inside diameter of the flame distributor 26 is important in that if the spacing is too small the flow of gas will be blocked, and if the spacing is too large, the gas will primirly burn near the top of the flame distributor 26. Preferably, a spacing of about 1/16th of an inch has been found to cause the gas to be evenly distributed along the flame distributor 26.

To separate a gas burning area 34 of the flame distributor 26 from an air intake portion 36 of the flame distributor, a sleeve 37 is secured about the flame distributor 26 intermediate its ends. This sleeve 37 not only separates the flame burning portion 34 from the air intake portion 36 of the flame distributor 26, but also provides a surface upon which the drawstring 28 of the mantle 27 can be tied. The location of the sleeve 37 is important in that if the distance between the deflector plate 31 and the sleeve is too great, the bottom of the mantle, upon shrinkage on burning, would break. Preferably, the sleeve 37 has a relatively smooth outer surface, and as the mantle shrinks when being prepared for use by burning, its loosely tied lower end will slide upwardly along the sleeve. The tubular flame distributor 26 preferably is formed from perforated metal sheet stock which is cut when in its flat condition so as to include notches at one end and is then rolled into the cylindrical shape shown. In this mode of construction, the sleeve 37 serves also as a retaining sleeve to maintain the cylindrical shape of the flame distributor 26.

The notches at the lower end of the flame distributor 26 define gripping fingers 38 to permit the lantern assembly 25 to be removably mounted on the upper portion 17 of the gas tube 11. The gripping fingers 38 may be bent slightly in order to permit the lower end of the flame distributor to be tightly positioned on the end of variable sized gas tubes. The gripping fingers 38 are urged toward their original position by their resilient spring force so as to tightly grip a tube end.

In order to utilize the lantern subassembly 25 to operate the combination campstove and lantern arrangement as a lantern, the burner head 14 is removed from the threaded upper end 17 of the gas tube 11; and the flame distributor 26, is placed onto the top of the gas tube 11 with the gripping fingers 38 securely engaging the threaded upper portion 17 of the gas tube. A cloth lantern mantle 27 is inverted and placed over the top of the flame distributor 26 and tied about the lower portion of the retaining sleeve 37. The mantle is burned to a white ash, acquiring the shape shown in FIG. 4. During such burning, the drawstring 28 slips upwardly along the sleeve 37 as the mantle 27 shrinks from its unburned condition in FIG. 3 to the burned condition of FIG. 4.

The mantle 27, although inverted from its normal in-use position, is maintained open by the deflector plate 31. After the mantle has been prepared, the valve 19 is opened by turning the control knob 21 providing a flow of gas from the tank T through the gas tube 11 and the lower portion 36 of the flame distributor 26 to the upper portion 34 of the flame distributor. Air for combustion is drawn in through the apertures in the lower portion 36 of the flame distributor 26 below the sleeve 37. The gas-air mixture is distributed evenly between the gas distributor rod 29 and the inside of the upper portion 34 of the flame distributor 26. This gas-air mixture is lit and burned to maintain the mantle 27 in a light-producing condition. It should be noted that on some campstove gas tubes 11 a secondary air hole 39 may be provided for mixing air with the gas supplied to the gas tube 11. In the use of the lantern subassembly 25, the presence or absence of a secondary air hole 39 in the gas tube is not critical due to the provision of the air intake apertures in the lower portion 36 of the flame distributor 26 below the sleeve 37.

The campstove, together with the lantern subassembly 25, is conveniently collapsible and easily stored. To this end, with both the burner head 14 and the lantern subassembly 25 removed from the burner base 10, the platform 13 is lifted off. The tank T is disconnected from the burner base, and the burner base is then unscrewed from the stand 12. The burner head, burner base, and lantern assembly are then conveniently placed in the stand and covered by the platform acting as a lid for storage and transport.

It can be seen therefore that a combination campstove and lantern arrangement has been described wherein the lantern subassembly is both light and relatively small in size and lends itself to easy storage and transport by backpacking campers. It may also be seen that such a lantern subassembly has been described which is capable of fitting onto a variety of campstove burner bases. Further, it can be seen that the described lantern subassembly uniquely utilizes a standard cloth lantern mantle for producing relatively bright light.

What is claimed is:

1. A collapsible campstove and lantern apparatus comprising a stand for supporting said apparatus in an upright position, a burner base mounted in upstanding relation on the stand and having a gas tube with an upper outlet end and a gas inlet end, a stove burner attachment removably mountable on said gas tube outlet end so that when gas is supplied through said gas tube and ignited said apparatus functions as a campstove, a lantern subassembly including a mantle support deflector plate and flame distributor member, said flame distributor member being removably mountable on said gas tube outlet end upon removal of said stove burner attachment, said deflector plate being mounted transversely on and extending radially outwardly from an upper end of said flame distributor member when said member is in mounted position on said gas tube, a cloth mantle positionable in inverted fashion over said mantle support deflector plate and flame distributor member with said deflector plate holding said mantle in a substantially open condition, said mantle having means for securing a lower end thereof about said flame distributor member so that when gas is supplied through said gas tube and member and ignited the mantle is illuminated and said apparatus functions as a lantern, and said stand, burner base, stove attachment, and lantern subassembly, all being disassembleable from each other whereby said burner base, stove attachment, and lantern subassembly may be contained in said stand for compact storage and transport.

2. The combination campstove and lantern arrangement of claim 1 including means removably mountable on said gas tube for supporting cooking hardware during use of said campstove, and upon disassembly, said burner base, stove attachment, and lantern subassembly are containable within said stand and hardware support means for storage and transport.

3. The combination campstove and lantern arrangement of claim 1 in which said mantle support and flame distributor member includes a cylindrical apertured sleeve, and a gas distributor element mounted concentrically within said apertured sleeve for defining a relatively narrow uniform gas passageway about the perimeter of said distributor element.

4. The combination campstove and lantern arrangement of claim 3 in which said apertured sleeve and gas distributor element are sized such that the width of the passageway about perimeter of said distributor element is about one-sixteenth inch.

5. The combination campstove and lantern arrangement of claim 3 in which said apertured member includes a relatively smooth unapertured portion intermediate its ends upon which said mantle is tied when placed over said mantle support and flame distributor member.

6. The combination campstove and lantern arrangement of claim 3 in which a relatively smooth outer surfaced retaining sleeve is positionable in close overlapping relationship with said apertured sleeve at a location intermediate the ends thereof, and said mantle is secured over said mantle support and flame distributor member by tying said mantle about said retaining sleeve.

7. The combination campstove and lantern arrangement of claim 3 in which the lower end of said apertured sleeve is formed with resilient finger portions for adjustably and removably engaging gas tube outlet ends of different sizes.

8. A combination campstove and lantern arrangement comprising a burner base having a gas tube with an upper end and a gas inlet, and a lantern subassembly including an elongated hollow flame distributor vertically mounted on the upper end of the gas tube, the flame distributor having an apertured upper elongated portion, and an elongated gas distributor element substantially centrally mounted in the upper portion of the flame distributor, means for closing the top end of the flame distributor including a deflector plate extending radially beyond the top of the flame distributor, means for removably mounting the flame distributor on the upper end of the gas tube whereby a mantle may be placed over the upper end of the flame distributor, spaced apart from its upper portion by the deflector plate, and tied about an intermediate portion of said the flame distributor so that when the gas is supplied through the gas tube and the flame distributor and lit, the mantle will be illuminated.

9. The arrangement of claim 8 in which the flame distributor has an unapertured intermediate portion about which said mantle is tied.

10. The arrangement of claim 9 in which the flame distributor has an apertured lower portion.

11. A mantle-type lantern subassembly for a campstove which has a gas tube upon which a burner head may be removably positioned, comprising a tubular flame distributor having a lower end defining gripping means for mounting said flame distributor on the end of said gas tube, said flame distributor having an apertured upper portion and an unapertured sleeve portion below said upper portion, a gas distributor rod mounted at the upper end of said flame distributor substantially concentrically therein and extending from said upper end to said sleeve portion, and a mantle deflector plate extending radially outwardly of said flame distributor for supporting a mantle in an open position about said flame distributor.

* * * * *